US006447910B1

(12) United States Patent
Wataya

(10) Patent No.: US 6,447,910 B1
(45) Date of Patent: Sep. 10, 2002

(54) BARIUM TITANATE PARTICLES WITH SURFACE DEPOSITION OF RARE EARTH ELEMENT

(75) Inventor: Kazuhiro Wataya, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/493,093

(22) Filed: Jan. 28, 2000

(30) Foreign Application Priority Data

Jan. 28, 1999 (JP) .......................................... 11-019536

(51) Int. Cl.[7] .............................. B32B 5/16; B05D 3/02
(52) U.S. Cl. ....................... 428/403; 427/215; 427/343; 427/376.2; 427/376.6
(58) Field of Search .......................... 428/403; 427/215, 427/343, 376.2, 376.6

(56) References Cited

U.S. PATENT DOCUMENTS

| | | | | |
|---|---|---|---|---|
| 4,014,822 A | * | 3/1977 | Fujikawa | 252/520 |
| 4,384,989 A | * | 5/1983 | Kamigaito et al. | 252/516 |
| 4,606,906 A | * | 8/1986 | Ritter et al. | 423/598 |
| 4,863,883 A | * | 9/1989 | Menashi et al. | 501/138 |
| 5,082,811 A | | 1/1992 | Bruno | 501/134 |
| 5,219,811 A | * | 6/1993 | Enomoto et al. | 501/138 |
| 5,523,065 A | * | 6/1996 | Stangle et al. | 423/71 |
| 6,071,842 A | * | 6/2000 | Takahashi et al. | 501/137 |
| 6,078,494 A | * | 6/2000 | Hansen | 361/321.5 |
| 6,268,054 B1 | * | 6/2001 | Costantino et al. | 428/403 |

FOREIGN PATENT DOCUMENTS

| | | |
|---|---|---|
| EP | 0889005 | 1/1999 |
| WO | 98/35920 | 8/1998 |

\* cited by examiner

*Primary Examiner*—Hoa T. Le
(74) *Attorney, Agent, or Firm*—Wenderoth, Lind & Ponack, L.L.P.

(57) ABSTRACT

Disclosed is a powder consisting of composite barium titanate particles having surface deposition of a water-insoluble rare earth compound such as yttrium oxide. The powder is used advantageously as a base material for the preparation of a sintered body such as ceramic capacitors of small thickness or compact size as compared with conventional powder blends of barium titanate particles and yttrium oxide particles in respect of greatly improved uniformity in the distribution of the yttrium element. The composite barium titanate particles with surface deposition of yttrium oxide can be prepared by conducting hydrolysis of urea in an aqueous medium containing a water-soluble yttrium salt dissolved therein in the presence of barium titanate particles to deposit basic yttrium carbonate on the particle surface followed by calcination of the particles to convert the basic yttrium carbonate into yttrium oxide.

13 Claims, 5 Drawing Sheets

BARIUM TITANATE PARTICLES WITH SURFACE DEPOSITION OF RARE EARTH ELEMENT

BACKGROUND OF THE INVENTION

The present invention relates to barium titanate particles with surface deposition of a rare earth element such as yttrium or, more particularly, to barium titanate particles bearing a water-insoluble compound of a rare earth element such as oxides or water-insoluble salts of the rare earth element as well as to a method for the preparation of such barium titanate particles.

As is well known, powders of barium titanate are widely employed long since as a material of ceramic capacitors. It is also known and practiced to admix the barium titanate powder with a compound of a rare earth element such as a rare earth oxide or, in particular, yttrium oxide in the preparation of barium titanate-based ceramic capacitors with an object to improve performance of the ceramic capacitor. A typical procedure of admixing a rare earth compound to a barium titanate powder is that a rare earth oxide powder is blended with the barium titanate powder and the powder blend is thoroughly agitated in a suitable powder-blending machine such as ball mills to give a uniform mixture of barium titanate particles and rare earth oxide particles usable in the preparation of ceramic capacitors.

In compliance with the trend in recent years in the field of electronic technology that ceramic capacitors are required to be more and more compact in size or smaller and smaller in thickness, the above mentioned powder blend of barium titanate particles and rare earth oxide particles is also required to have increased uniformity of blending in addition to the requirement for a smaller and smaller particle diameter of the barium titanate particles as well as of the rare earth oxide particles. Since the rare earth oxide powder products available on the market usually have an average particle diameter exceeding the sub-micron range and a highly uniform powder blend can hardly be obtained from such a rare earth oxide powder with a barium titanate powder, full improvement of the performance of thin-layered or compact-size ceramic capacitors cannot be accomplished by the admixture of a rare earth oxide powder to a barium titanate powder.

SUMMARY OF THE INVENTION

The present invention accordingly has an object, in order to overcome the above described problems in the prior art, to provide a powder based on barium titanate particles containing a rare earth compound with microscopically high uniformity of mixing.

Thus, the present invention provides barium titanate particles bearing a water-insoluble salt or an oxide of a rare earth element deposited on the surface of the particles.

The invention also provides a method for the preparation of the above defined barium titanate-based particles which comprises the steps of:

(a) dispersing particles of barium titanate in an aqueous solution as a suspension medium containing a water-soluble salt of a rare earth element and urea dissolved therein to give an aqueous suspension;

(b) heating the aqueous suspension of barium titanate particles prepared in step (a) at a temperature of 70° C. or higher to effect hydrolysis of urea and to deposit a basic carbonate of the rare earth element on the surface of the barium titanate particles; and (c) separating the barium titanate particles having surface deposition of the basic carbonate of the rare earth element from the suspension medium.

The basic carbonate of the rare earth element deposited on the surface of the barium titanate particles can be converted, in step (d), to a rare earth oxide by calcining the powder at a temperature of 600° C. or higher in an oxidizing atmosphere to give a barium titanate powder containing a rare earth oxide with high uniformity.

DETAILED DESCRIPTION OF THE PREFERRED EMBODIMENTS

Figure 1:
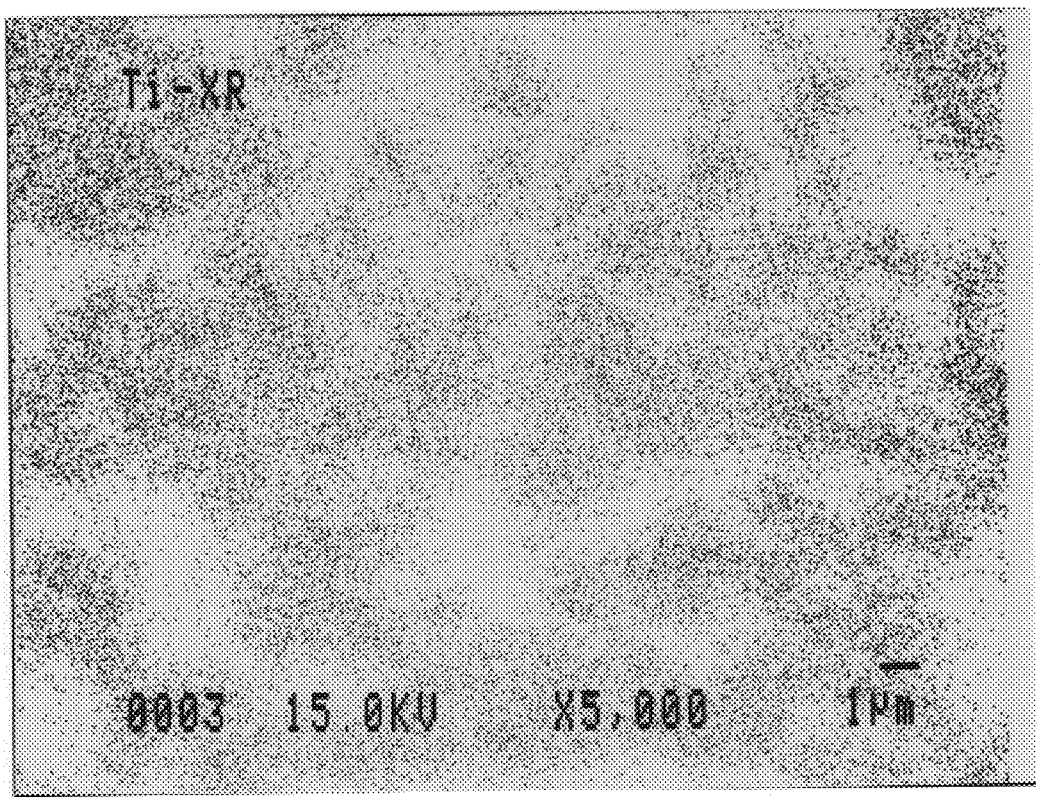
FIG. 1 is a photograph showing distribution of titanium obtained by the electron beam microprobe analysis (EMPA) on the surface of the barium titanate particles having surface deposition of yttrium oxide prepared in the Example.

The inventor previously disclosed, in Japanese Patent Kokai 11-21124, a method for the preparation of yttrium oxide alumina composite particles involving a step of deposition of a basic carbonate of yttrium on the surface of alumina particles. The present invention has been established as a result of the inventor's further continued investigations for the preparation of yttrium oxide/barium titanate composite particles.

In step (a) of the above described inventive method, an aqueous suspension or aqueous slurry of barium titanate particles is prepared in an aqueous solution containing a water-soluble salt of a rare earth element and urea dissolved therein as a suspension or dispersion medium. In step (b) of the inventive method, the above prepared aqueous suspension of barium titanate particles is heated under agitation at a temperature of 70° C. or higher so that the urea contained in the aqueous medium is hydrolyzed into ammonia and carbon dioxide or carbonic acid to deposit a basic carbonate of the rare earth element uniformly on the surface of the barium titanate particles. In step (c), the barium titanate particles thus coated with the basic carbonate of the rare earth element are separated from the aqueous suspension medium. It is usual that the thus obtained barium titanate-based composite particles are subjected to a calcination treatment at a temperature of 600° C. or higher in an oxidizing atmosphere so that the basic carbonate of the rare earth element is decomposed and converted into the rare earth oxide to give rare earth oxide/barium titanate composite particles.

According to the above described preparation method, the basic carbonate of the rare earth element is deposited on the surface of the barium titanate particles so uniformly that the resultant rare earth oxide/barium titanate composite particles have uniform distribution of the rare earth element to the extent of the diameter of the barium titanate particles. This is a great advantage of the present invention over the prior art method of mechanical blending of barium titanate particles and rare earth oxide particles in which uniformity of blending is limited by the contacting of particles of different kinds at the best.

The particle size of the barium titanate particles is a limiting factor on the uniformity of the rare earth element so that the barium titanate particles should have an average particle diameter selected depending on the particular object of using the composite particles. Generally, the barium titanate particles preferably have an average particle diameter in the range from 0.1 to 2.0 $\mu$m. It is of course that distribution of the particle diameter should be as uniform as possible.

The rare earth element to which the present invention is applicable includes yttrium and the elements having an atomic number in the range from 57 to 71 without particular limitations. The water-soluble rare earth salt to be dissolved in the aqueous suspension medium is preferably an inorganic salt, such as nitrates, sulfates and chlorides or an organic salt such as acetates, of which nitrates of the rare earth element are usually preferred. Following description is given by taking yttrium as a typical example of the rare earth element and nitrate of the element as an example of the water-soluble salt although the scope of the present invention is never limited by these examples.

The concentrations or contents of the respective ingredients. In the aqueous suspension prepared in step (a) of the inventive method are as follows. The amount of the barium titanate powder added to the aqueous suspension medium is not limitative provided that the resultant aqueous suspension or slurry can be easily and thoroughly agitated in the reaction vessel. The amount of the water-soluble yttrium salt dissolved in the aqueous medium naturally depends on the desired content of yttrium oxide in the barium titanate-based composite oxide particles so that the amount of the salt can readily be calculated from stoichiometry relative to the amount of the barium titanate particles. When the intended use of the yttrium oxide/barium titanate composite oxide powder is as a base material of ceramic capacitors, in particular, the amount of the water-soluble yttrium salt is preferably in the range from 0.5 to 10% by weight relative to the amount of the barium titanate powder. The amount of urea to be dissolved in the aqueous medium together with the yttrium nitrate should be at least 3 moles or, preferably, in the range from 12 to 20 moles per mole of the water-soluble yttrium salt or yttrium nitrate.

The aqueous suspension or slurry of barium titanate particles prepared in step (a) of the inventive method is then, in step (b), heated to effect hydrolysis reaction of urea. The temperature of heating should be 70° C. or higher or, preferably, 80° C. or higher or, more preferably, 90° C. or higher up to the boiling point of the suspension which may be somewhat higher than 100° C. depending on the concentration of the solutes in the aqueous suspension medium although the heating treatment conducted at the boiling point is not always desirable in respect of stability of the hydrolysis reaction of urea under such a boiling condition. When the heating temperature is too low, the rate of the hydrolysis reaction is so low as a matter of course that an unduly long time is taken for completion of the reaction.

When the hydrolysis reaction of urea is undertaken under adequately controlled conditions, urea is hydrolyzed to form ammonia and carbonic acid which in turn react with the yttrium ions to form a basic carbonate of yttrium. Since this reaction proceeds predominantly on the surface of the barium titanate particles, the basic carbonate as formed is deposited onto the surface of the barium titanate particles to give composite particles having a cladding/core structure.

The length of time taken for this heating treatment in step (b) of the inventive method naturally depends on various factors such as the concentrations of the yttrium salt and urea dissolved in the aqueous medium and heating temperature. Assuming that the concentration of the yttrium salt is 0.05 mole/liter, the concentration of urea is 0.75 mole/liter and the heating temperature is 95° C., the heating treatment of the aqueous slurry for about 60 minutes is usually sufficient to give a satisfactory result. Completion of the precipitation reaction of the basic carbonate can readily be detected by periodically taking a small portion of the reaction mixture followed by filtration to give a clear filtrate which is alkalified for the formation of white precipitates of yttrium hydroxide in an occasion of incomplete reaction of the yttrium salt.

After completion of the hydrolysis reaction of urea to form basic yttrium carbonate, the solid particles suspended in the aqueous slurry are collected by subjecting the aqueous slurry to a conventional solid-liquid separation method such as filtration through a filter paper or cloth on a Buchner funnel, centrifugal separation, centrifugal settling and decantation to give a wet cake of the composite particles which is washed with water, dried and, if necessary, disintegrated to give a powder of composite particles consisting of barium titanate as the core and basic carbonate of yttrium as the cladding on the core.

The thus obtained composite particles of barium titanate and basic carbonate of yttrium are then subjected to a calcination treatment in an oxidizing atmosphere such as air at a temperature of 600° C. or higher so that the basic carbonate of yttrium is thermally decomposed and converted into yttrium oxide to give composite particles consisting of barium titanate as the core and yttrium oxide as the cladding deposited on the core surface. When the calcination temperature is lower than 600° C. or the atmosphere for calcination is insufficiently oxidizing, the thermal decomposition reaction of basic yttrium carbonate into yttrium oxide cannot be complete sometimes resulting in the formation of a carbonaceous matter. Though dependent on the temperature, conditions of the atmosphere and other factors, the calcination treatment is conducted usually for at least 30 minutes in an oxidizing atmosphere.

The thus obtained barium titanate-based composite particles bearing surface deposition of a water-insoluble salt or oxide of a rare earth element have a cladding/core structure in which the distribution of the cladding layer on the core particles of barium titanate is very uniform even in the case where the content of the rare earth compound is 50% by weight or even higher.

As an alternative method, barium titanate particles bearing a cladding layer of a rare earth oxide can be obtained by a method in which a rare earth hydroxide is deposited on the surface of the barium titanate particles in an aqueous medium containing a water-soluble rare earth salt in the presence of ammonia followed by calcination of the rare earth hydroxide-coated barium titanate particles.

In the following, a more detailed description is given of the present invention by way of an Example and a Comparative Example.

EXAMPLE

An aqueous suspension was prepared by adding 100 g of a barium titanate powder having an average particle diameter of about 1.0 μm to and by dissolving 0.05 mole of yttrium nitrate in deionized water followed by addition of deionized water to make up a total volume of 10 liters. The suspension was further admixed with 45 g (0.75 mole) of urea to be dissolved therein. The aqueous suspension was heated under agitation at about 95° C. for a period of 60 minutes. Completion of the reaction could be detected by taking a small portion of the suspension which was filtered to give a clear filtrate followed by the addition of ammonia water to find absolutely no precipitates of yttrium hydroxide. Upon completion of the reaction thus confirmed, the whole volume of the reaction mixture was filtered by using a Buchner funnel to give a cake of the particles which was thoroughly washed with water, dried and disintegrated. The thus obtained powder was subjected to a calcination treatment at 700° C. for about 2 hours in an atmosphere of air.

The thus obtained composite particles of barium titanate and yttrium oxide were subjected to the analysis of distribution of the constituent elements by the methods of electron beam microprobe analysis (EMPA) and X-ray photoelectron spectroscopy (XPS). The results were that the distribution of yttrium was in good overlapping with the distributions of barium and titanium elements forming the barium titanate particles according to EMPA and distribution of yttrium was limited to the surface layer of the particles having a thickness of 100 nm or smaller according to XPS.

Figure 2:
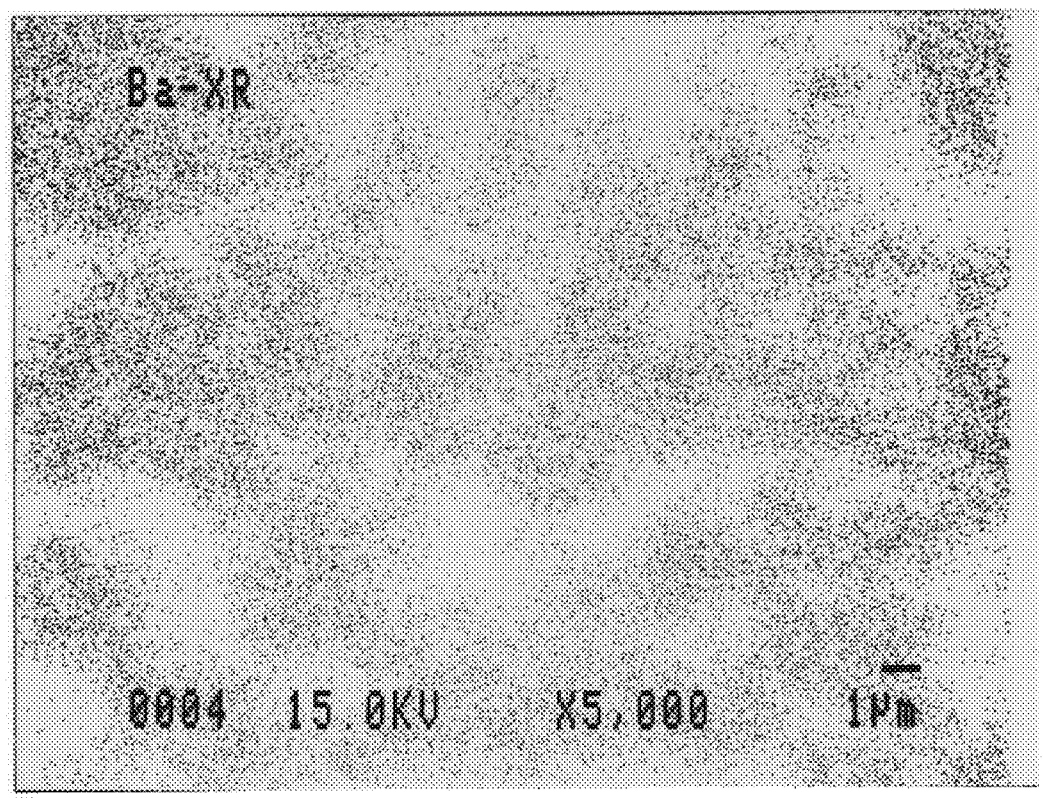
FIG. 2 is an EMPA photograph showing distribution of barium in the same view field as in FIG. 1.
Figure 3:
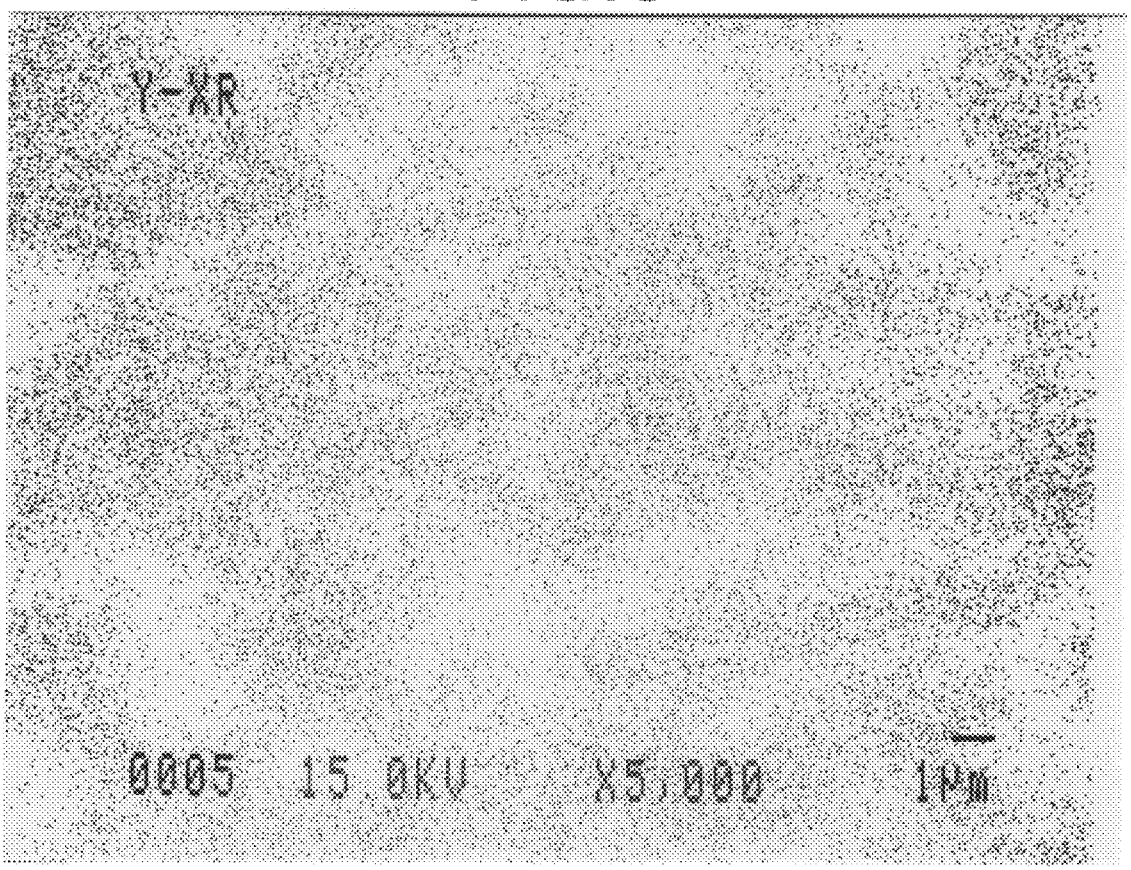
FIG. 3 is an EMPA photograph showing distribution of yttrium in the same view field as in FIG. 1.

FIGS. 1 to 3 are each a photograph showing the result of EMPA, of which FIG. 1 is for the distribution of titanium, FIG. 2 is for the distribution of barium and FIG. 3 is for the distribution of yttrium within the same view field. Comparison of these photographs for the distribution of darkened areas, i.e. areas rich in the content of the respective element, supports the conclusion that the distribution of yttrium in the cladding layers is substantially identical to that of titanium and barium forming the barium titanate particles.

Figure 4:
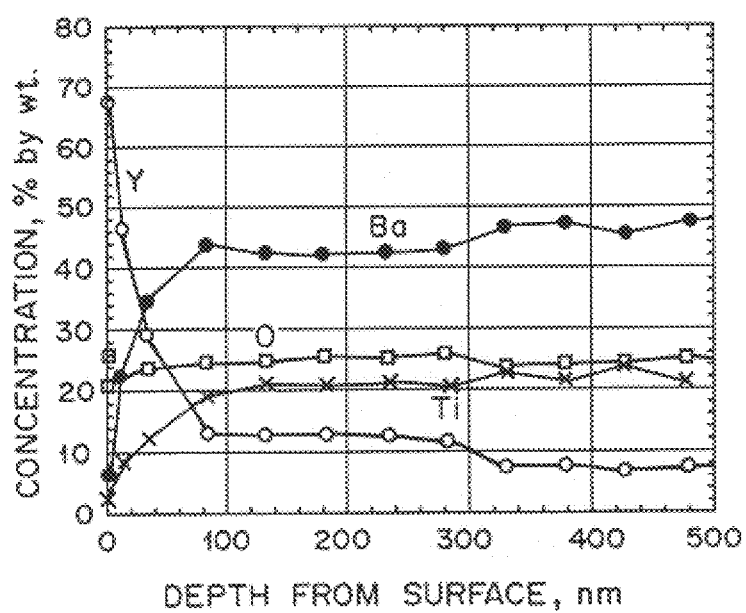
FIG. 4 is a graph showing distribution of titanium (curve Ti), barium (curve Ba), yttrium (curve Y) and oxygen (curve O) in the direction of depth from the surface of a particle taken from the same sample as in FIGS. 1 to 3 as determined by the method of X-ray photoelectron spectroscopy (XPS).

FIG. 4 is a graph showing the result of the XPS analysis for the distributions of the respective constituent elements along the direction of depth from the surface of a particle taken from the same sample lot as used in EMPA shown in FIGS. 1 to 3. This graph indicates that the distribution of yttrium is localized within a surface layer of about 100 nm thickness while deficiency in the concentration of titanium and barium in this surface layer evidences that the core of the particles is formed from barium titanate. The depth scale in this XPS analysis was calibrated by utilizing the sputtering rate of silicon dioxide as a reference sample.

Figure 9:
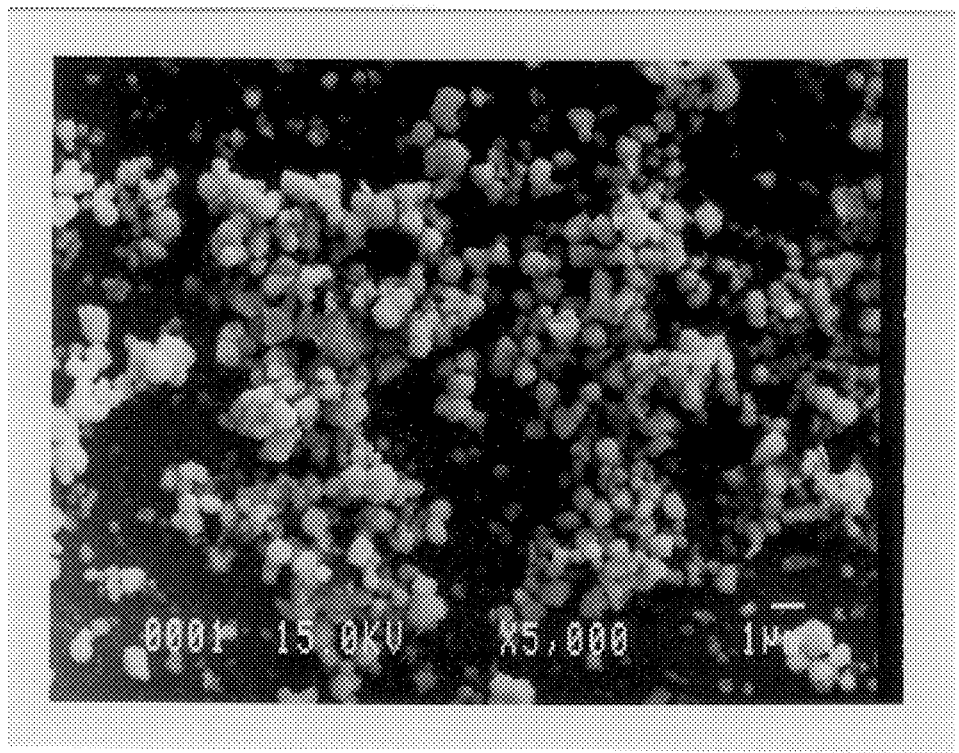
FIGS. 9 and 10 are each a scanning electron microscopic photograph of the barium titanate-based composite particles prepared in Example and in Comparative Example, respectively.

FIG. 9 is a scanning electron microscopic photograph of the yttrium oxide/barium titanate composite particles prepared in this Example.

COMPARATIVE EXAMPLE

An aqueous slurry was prepared by thoroughly milling, in a ball mill for 24 hours, a mixture of 100 g of a barium titanate powder having an average particle diameter of about 1.0 μm, 5.645 g of a yttrium oxide powder having an average particle diameter of about 0.3 μm, 100 g of deionized water and a small amount of a deflocculant. The thus prepared aqueous slurry was dried by heating to evaporate water to dryness giving about 100 g of the powder blend.

Figure 5:
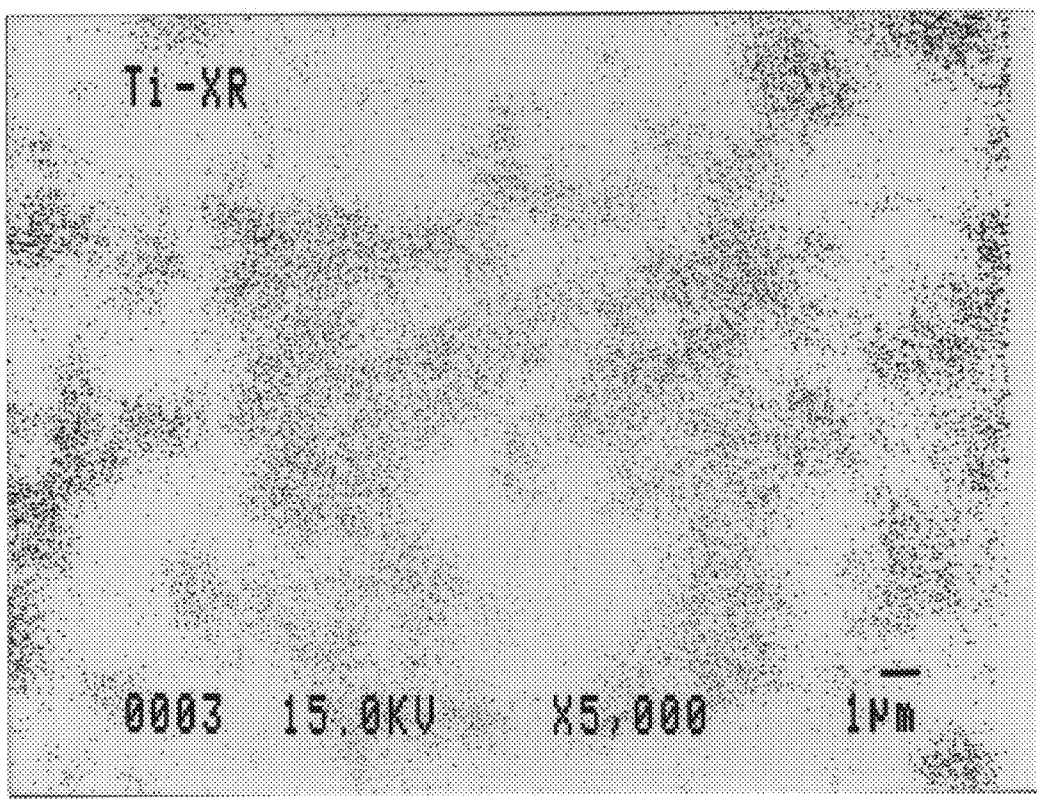
FIG. 5 is an EMPA photograph showing distribution of titanium obtained by the EMPA on the surface of the powder blend barium titanate prepared in the Comparative Example.
Figure 6:
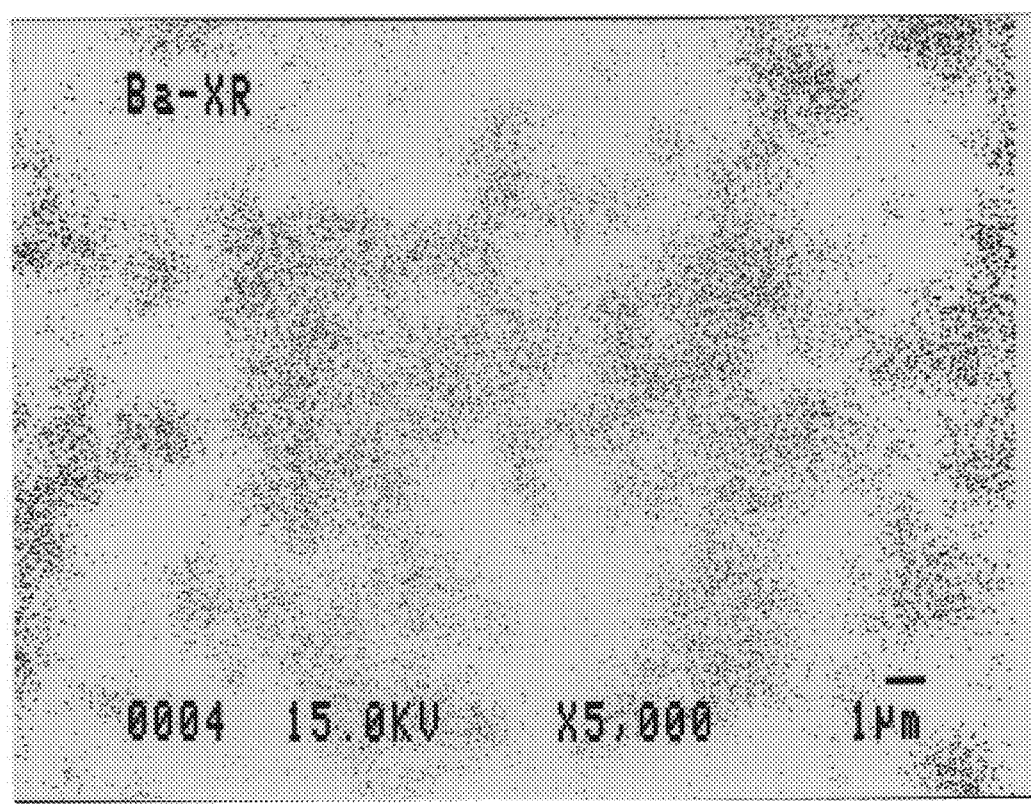
FIG. 6 is an EMPA photograph showing distribution of barium in the same view field as in FIG. 5.
Figure 7:
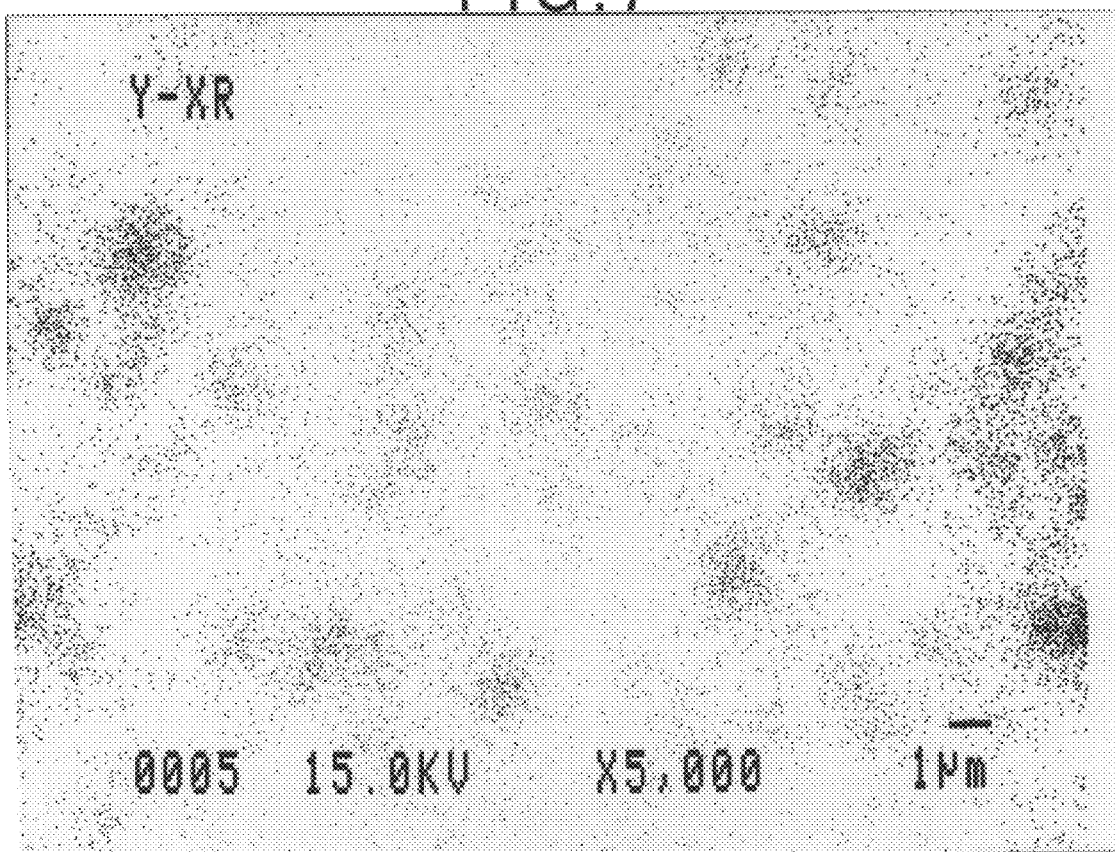
FIG. 7 is an EMPA photograph showing distribution of yttrium in the same view field as in FIG. 5.
Figure 8:
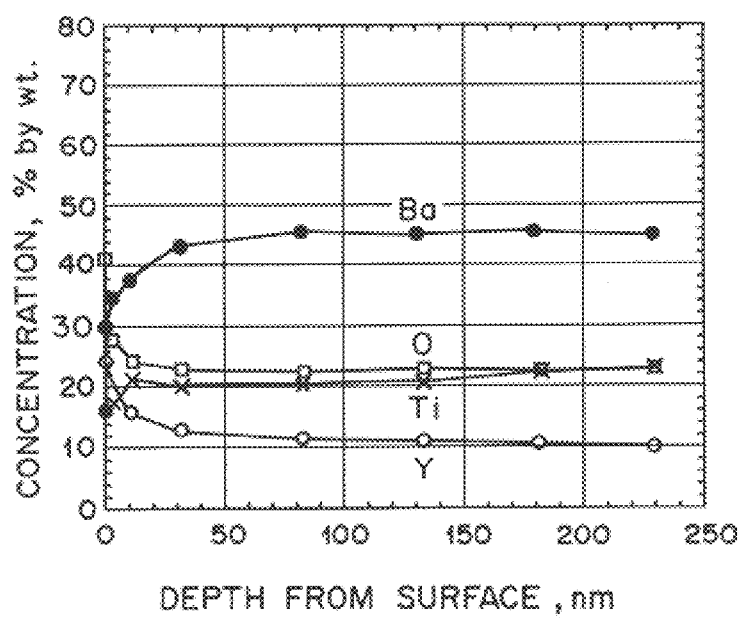
FIG. 8 is a graph showing distribution of titanium (curve Ti), barium (curve Ba), yttrium (curve Y) and oxygen (curve O) in the direction of depth from the surface of a particle taken from the same sample as in FIGS. 5 to 7 as determined by the XPS method.

Particles of the thus obtained dry powder were subjected to the EMPA in the same manner as in Example to give the results shown in the EMPA photographs of FIGS. 5 to 7, of which FIG. 5 is for the distribution of titanium, FIG. 6 is for the distribution of barium and FIG. 7 is for the distribution of yttrium. Comparison of these photographs indicates that the barium titanate particles and yttrium oxide particles are discretely isolated each from the others as is evidenced by the great difference in the pattern distribution between FIGS. 5 and 6 for titanium and barium and that of FIG. 7 for yttrium.

Figure 10:

FIG. 10 is a scanning electron microscopic photograph of the above prepared powder blend of barium titanate particles and yttrium oxide particles.

What is claimed is:

1. Composite particles of barium titanate bearing a water-insoluble compound of a rare earth element deposited on the surface of the particle, in which each particle has a cladding/core structure consisting of a core particle of barium titanate and a cladding layer of a water-insoluble salt or oxide of a rare earth element uniformly deposited on the core particle.

2. The composite particles of barium titanate as claimed in claim 1 in which the water-insoluble compound of a rare earth element is a basic carbonate of the rare earth element.

3. The composite particles of barium titanate as claimed in claim 1 in which the water-insoluble compound of a rare earth element is an oxide of the rare earth element.

4. The composite particles of barium titanate as claimed in claim 1 in which the rare earth element is yttrium.

5. The composite particles of barium titanate as claimed in claim 1 which the content of the water-insoluble compound of a rare earth element is at least 50% by weight.

6. A method for the preparation of composite particles of barium titanate bearing a basic carbonate of a rare earth element deposited on the surface of the particles which comprises the steps of:

(a) dispersing particles of barium titanate in an aqueous solution as a suspension medium containing a water-soluble salt of the rare earth element and urea to form an aqueous suspension of the particles of barium titanate;

(b) heating the aqueous suspension of the particles of barium titanate at a temperature of 70° C. or higher to deposit a basic carbonate of the rare earth element on the surface of the particles of barium titanate; and (c) separating the particles of barium titanate bearing a basic carbonate of the rare earth element deposited on the surface from the suspension medium.

7. The method for the preparation of composite particles of barium titanate bearing a basic carbonate of a rare earth element deposited on the surface of the particles as claimed in claim 6 in which the amount of urea dissolved in the suspension medium is at least 3 moles per mole of the water-soluble salt of the rare earth element.

8. The method for the preparation of composite particles of barium titanate bearing a basic carbonate of a rare earth element deposited on the surface of the particles as claimed in claim 7 in which the amount of urea dissolved in the suspension medium is in the range from 12 to 20 moles per mole of the water-soluble salt of the rare earth element.

9. The method for the preparation of composite particles of barium titanate bearing a basic carbonate of a rare earth element deposited on the surface of the particles as claimed in claim 6 in which the water-soluble salt of a rare earth element is a nitrate of the rare earth element.

10. The method for the preparation of composite particles of barium titanate bearing a basic carbonate of a rare earth element deposited on the surface of the particles as claimed in claim 6 in which the temperature of heating in step (b) is 90° C. or higher but lower than the boiling temperature of the aqueous suspension.

11. A method for the preparation of composite particles of barium titanate bearing an oxide of a rare earth element deposited on the surface of the particles which comprises the steps of:

(a) dispersing particles of barium titanate in an aqueous solution as a suspension medium containing a water-soluble salt of the rare earth element and urea to form an aqueous suspension of the particles of barium titanate;

(b) heating the aqueous suspension of the particles of barium titanate at a temperature of 70° C. or higher to deposit a basic carbonate of the rare earth element on the surface of the particles of barium titanate;

(c) separating the particles of barium titanate bearing a basic carbonate of the rare earth element deposited on the surface from the suspension medium; and (d) calcining the particles of barium titanate bearing a basic carbonate of the rare earth element deposited on the surface at a temperature of 600° C. or higher in an atmosphere of an oxidizing gas.

12. The method for the preparation of composite particles of barium titanate bearing an oxide of a rare earth element deposited on the surface of the particles as claimed in claim 11 in which the length of time for the calcination in step (d) is at least 30 minutes.

13. A method for the preparation of composite particles of barium titanate bearing an oxide of a rare earth element deposited on the surface of the particles which comprises the steps of:

(a) dispersing particles of barium titanate in an aqueous solution as a suspension medium containing a water-soluble salt of the rare earth element to form an aqueous suspension of the particles of barium titanate;

(b) admixing the aqueous suspension of the particles of barium titanate with ammonia or ammonia water to deposit a hydroxide of the rare earth element on the surface of the barium titanate particles;

(c) separating the particles of barium titanate bearing a hydroxide of the rare earth element deposited on the surface from the suspension medium; and (d) calcining the particles of barium titanate bearing a hydroxide of the rare earth element deposited on the surface at a temperature of 600° C. or higher.

* * * * *